US006928174B1

(12) United States Patent
Mantysalo et al.
(10) Patent No.: US 6,928,174 B1
(45) Date of Patent: Aug. 9, 2005

(54) MICROPHONE STRUCTURE

(75) Inventors: Tapio Mantysalo, Littoinen (FI); Nina Muurinen, Preitila (FI); Karl-Erik Gustafsson, Turku (FI)

(73) Assignee: Nokia Mobile Phones Ltd., Espoo (FI)

( * ) Notice: Subject to any disclaimer, the term of this patent is extended or adjusted under 35 U.S.C. 154(b) by 659 days.

(21) Appl. No.: 09/711,715

(22) Filed: Nov. 13, 2000

(30) Foreign Application Priority Data

Mar. 10, 2000 (FI) .................................. 20000569
Jun. 2, 2000 (FI) .................................. 20001327

(51) Int. Cl.7 ........................... H04R 3/00; H04M 1/00
(52) U.S. Cl. ....................... 381/113; 381/111; 381/122; 455/550.1
(58) Field of Search ........................ 381/111–115, 355, 381/175, 369, 122; 455/90.3, 95, 575.1, 550.1

(56) References Cited

U.S. PATENT DOCUMENTS 4,817,164 A * 3/1989 Bertignoll et al. .......... 381/189
4,937,877 A * 6/1990 Pocock et al. .............. 381/360
5,880,643 A * 3/1999 Bjork et al. .................. 331/44
5,930,098 A 7/1999 Voldman et al. ............ 361/111
5,940,520 A * 8/1999 Endo .......................... 381/111
6,218,883 B1 * 4/2001 Takeuchi .................... 327/318
6,453,048 B1 * 9/2002 Akino ........................ 381/113
6,504,937 B1 * 1/2003 Papadopoulos et al. ..... 381/113
6,516,069 B1 * 2/2003 Takeuchi et al. ............ 381/122
6,642,297 B1 * 11/2003 Hyatt et al. ................. 524/492
6,728,555 B1 * 4/2004 Pirila et al. ................. 455/566
2003/0228848 A1 * 12/2003 Escoffier et al. .............. 455/91

* cited by examiner

*Primary Examiner*—Laura A. Grier
(74) *Attorney, Agent, or Firm*—Perman & Green, LLP

(57) ABSTRACT

A microphone structure comprising a microphone (M) and an electro-static discharge protector (ZD) placed close to microphone capsule (300), preferably inside it. Further the structure comprises within the microphone capsule an e.g. ladder-type filter having parallel capacitors (C31, C32, C33) and series resistors or coils (R31, Z) protecting the microphone from radio frequency disturbances. Structure parts may be on same circuit board or in same integrated circuit (IC). Structure is less susceptible to RF disturbances than known structures and its production costs are lower.

14 Claims, 5 Drawing Sheets

MICROPHONE STRUCTURE

BACKGROUND OF THE INVENTION

1. Field of the Invention

The invention relates in general to microphones. In particular the invention relates to microphones in mobile phones and their accessories.

2. Brief Description of Related Developments

There is a general need to protect microphones against radio frequency (RF) disturbances for ensuring the proper performance of the microphones. Microphone of mobile phone or mobile phone accessory should furthermore be immune to RF disturbances at the frequencies the cellular system uses. Consider for example a headset accessory of a mobile phone. It has a small earpiece connected to the mobile phone with a wire and the microphone of the headset mounted on a stiff wire at suitable distance from the earpiece so that the microphone can pick up the voice of the user. The user may carry the mobile phone in a pocket during a call. If the user carries the mobile phone in a breast pocket of a shirt or a jacket, the microphone of a headset is very near the radio transmitter of the mobile phone. If the microphone is not adequately protected, it can demodulate the radio frequency signal, in which case the quality of audio signal may deteriorate. Furthermore, there is need to protect microphones against electrostatic discharge (ESD).

Electret microphone is general type of microphones used in mobile phones and accessories. An electret microphone contains a preamplifier, typically a field effect transistor (FET), and voice is converted to electrical signal by capacitance. Changes in the air pressure cause changes to the capacitance between a conductive plate and a conductive polarized foil. The conductive plate, the conductive foil, FET and other microphone parts, which are typically capacitors, are typically placed in side a microphone capsule. This capsule has typically two output contacts with which it is connected to external circuitry.

Electret microphones are protected against RF disturbances and ESD in various ways. FIG. 1 shows an example of a prior-art protection circuit. The circuit relates to a headset accessory of a mobile phone. In the Figure there can be seen a microphone capsule 100, first protection circuit 110, a transmission line 120 between the headset accessory and mobile device, second protection circuit 130 and microphone amplifier 140. The microphone capsule contains an electret microphone M1 comprising FET Q1, which functions as preamplifier. The drain of FET is connected to first output contact OC1 of microphone capsule and the drain of FET is connected to second output contact OC2 of microphone capsule. Further the microphone capsule contains for RF-protection a capacitor C11 connected between the output contacts of microphone capsule. The capacitance of capacitor C11 is small. Together with the stray inductance of capacitor it causes a series resonance at certain frequency band, which is arranged to including the transmitting band of the mobile phone in question. Then the parallel capacitor C11 attenuates disturbances occurring at said band. The problem here is that the RF protection works only at narrow frequency band. The layout of the microphone components on a circuit board inside capsule has to be done very carefully, and changes in the capacitance values of the capacitors, even changes within production tolerances, may cause the RF protection to shift out from the desired frequency band.

The first protection circuit 110 is connected to first and second output contacts of microphone capsul. The circuit includes in succession from the microphone capsule a series coil L11 at second output contact, a parallel ESD protector VDR1, a series coil L12 at first output contact and a parallel capacitor C12. The capacitor C12 and coil L12 are for filtering disturbances. The ESD protector is in this example a voltage dependent resistor (VDR) or varistor. Its resistance drops shorting the circuit when a electrostatic disturbance having relatively high energy arrives along the transmission line 120. The disadvantage of the external varistor is that it has some internal capacitance, which couples with the capacitance of capacitor C11 causing a new resonance. This may lead to RF immunity failures at some frequency band. For this reason there is coil L11, e.g. a ferrite bead, in the protection circuit 110. It weakens said capacitive coupling and corresponding resonance. However the inductance of coil L11 may cause significant resonance at certain other frequencies. It is possible to add a resistor R11, instead of a coil, in series to one output conductor of the microphone capsule, to weaken said capacitive coupling. However such a resistor should be very large to sustain an ESD pulse. Small surface mounted resistors change their resistance and typically fail in ESD tests. Further adding a resistor between the ESD protector and the microphone may cause the microphone more susceptible to ESD.

The second protection circuit 130 at the other end of headset cable is for protecting the actual microphone amplifier 140. The second protection circuit includes a series coil L13 and a parallel circuit forming of a capacitor C13 and a resistor R12 connected in series.

So in conventional design there may be several, up to ten additional components whose purpose is to protect the microphone from ESD and RF disturbances. The immunity to both ESD and RF disturbances is still inadequate. By means of additional components are overcame some problems, but at the same time arise new difficulties. The more components there are in the circuit, the larger are the conductive loops of circuit and correspondingly the greater the susceptibility to RF-disturbances. Further additional components make new resonance problems.

SUMMARY OF THE INVENTION

The object of the invention is to present a microphone structure which is compact, relatively immune to radio frequency disturbances and protected against electro-static discharge.

The basic idea of the invention is as follows: An electrostatic discharge protector is placed close to microphone capsule, preferably inside it, between two output conductors of capsule. Parallel with the preamplifier there is a capacitor. Between this capacitor and said ESD-protector is a series resistor. The capacitor, resistor and ESD protector form a low-pass filter protecting the microphone from radio frequency disturbances. The filter structure may include also additional components.

A microphone structure according to the invention comprises a microphone capsule, which has at least first and second output contact, and within said microphone capsule

- means for converting changes in air pressure to an electrical signal,
- preamplifier having first and second output conductor and
- a first capacitor connected between said output conductors of the preamplifier, and is characterized in that it further comprises an electro-static discharge protector connected between said output contacts of microphone capsule and, within the microphone capsule, a first impedance in series between said first output conductor and said first output contact.

The advantage of the invention is that when the ESD protector is placed just close to the microphone capsule or within the microphone capsule, it functions both as an ESD protector and a part of a low-pass filter. Another advantage of the invention is that when the disturbances are filtered within the microphone capsule, the conductive capsule functions as a Faraday cage enhancing the RF-immunity of the microphone. Further advantage of the invention is that the conductive loops of the protective circuit are small making the circuit less susceptible to RF disturbances. A further advantage of the invention is that for the capacitance values are allowed greater tolerances than in known structures. This is caused by the fact that the filter in accordance with the invention attenuates disturbances at wider frequency band than known protective structures inside microphone capsule. A further advantage of the invention is that the internal capacitance of the ESD protector does not form above mentioned problem in RF-immunity. On the contrary the internal capacitance improves the RF-immunity, because it is a part of said filter. A further advantage of the invention is that the microphone in accordance with it may function as an ESD protector for other components outside the microphone capsule, typically for the input stage of the microphone amplifier. A further advantage of the invention is that the structure according to it is relatively low in production costs because it has several components less than known microphones with external protection circuitry, and all components needed can be mounted on the same circuit board inside microphone capsule.

BRIEF DESCRIPTION OF THE DRAWINGS

The invention will now be described more in detail. In the description, reference will be made to the accompanying drawings where.

DETAILED DESCRIPTION OF THE PREFERRED EMBODIMENT(S)

Figure 1:
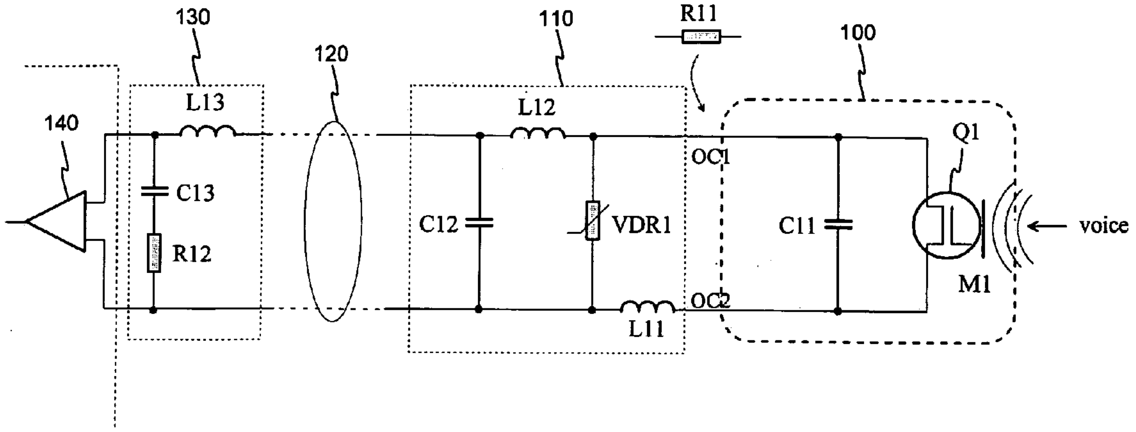
Fig. 1 PRIOR ART
FIG. 1 shows an example of microphone circuit diagram according to the prior art.

FIG. 1 was already discussed in connection with the description of the prior art.

Figure 2:
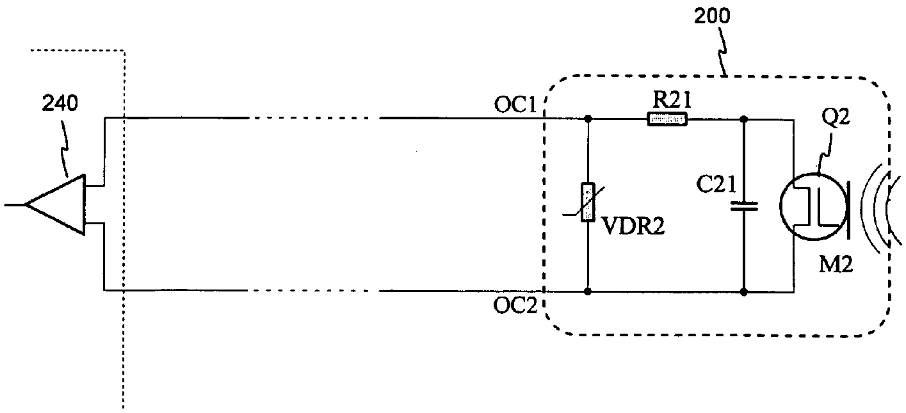
FIG. 2 shows an example of microphone circuit diagram according to the invention.

FIG. 2 presents an example of microphone circuit diagram according to the invention. It comprises a microphone capsule 200 containing an electret microphone M2 and in parallel with it a RF-protection a capacitor C21, as in FIG. 1. Further the microphone capsule contains an ESD protector VDR2 and a resistor R21. The ESD protector is between the output contacts of microphone capsul and the resistor R21 is in series with one output conductor between capacitor C21 and ESD protector VDR2. Said three components form then a Π-structure. The capacitance of ESD protector is now exploited so that the Π-structure functions as a filter having relatively wide rejection band. Outside the microphone capsul are now not needed any components. The circuit protects both the microphone M2 and the microphone amplifier 240. Then a separate protection circuit at the input of microphone amplifier is not needed, too.

Figure 3:
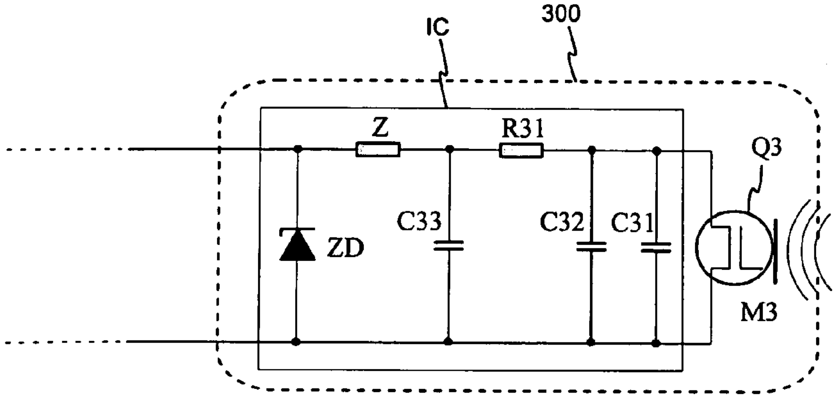
FIG. 3 shows another example of microphone circuit diagram according to the invention.

FIG. 3 presents another example of microphone circuit diagram according to the invention. All parts presented are inside a microphone capsule 300. The circuit is a ladder structure, which includes in the direction from output contacts OC1 and OC2 of the microphone capsule to the microphone M3 following parts: A parallel ESD-protector ZD, a series impedance Z, a parallel capacitor C33, a series resistor R31, two parallel capacitors C32 and C31, and a microphone M3 comprising a FET Q3. The said structure includes more loops than the structure in FIG. 2, in which case there are wider possibilities to determine properties of the filter in question. The filter can have yet more loops than presented in FIG. 3.

The impedance Z may be mainly resistive or mainly inductive. In latter case it may be e.g. a coil or a ferrite bead. The ESD-protector is in this example a zener diode. It may be also another semiconductor or a polymer component. The polymer component means in this description and patent claims a component having small conductive pieces in plastics and controlled breakdown characteristics.

In the example of FIG. 3 the structure parts zenerdiode ZD, part Z, capacitor C33, resistor R31, capacitor C32 and capacitor C31 are integrated forming one component IC. Because of the loops of the circuit are very small and inside the conductive casing of the capsule they do not impair the susceptibility to RF-disturbances.

Figure 4:
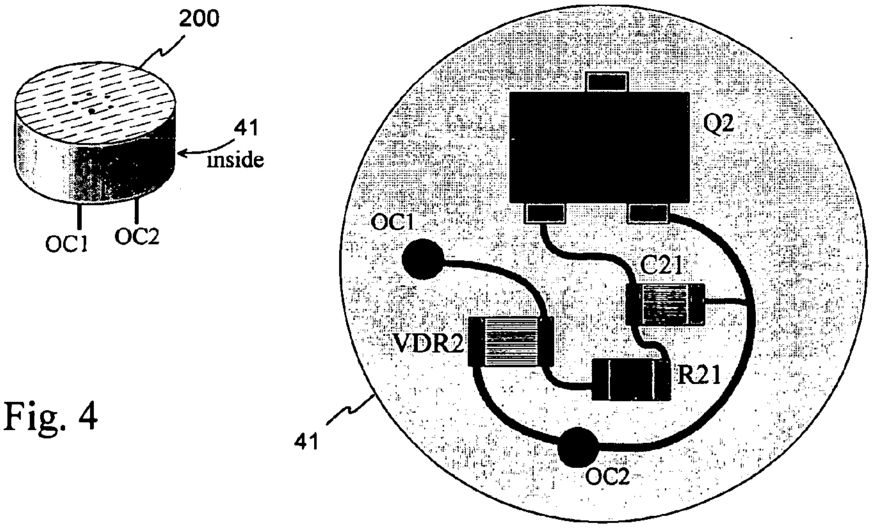
FIG. 4 shows an example of layout of the circuit according to FIG. 2.

FIG. 4 presents an example of layout of the circuit according to the invention. In Figure is seen enlarged a circuit board 41, on which there are components connected in accordance with FIG. 2. The reference characters, too, are same in FIGS. 4 and 2. Capacitor C21, resistor R21 and varistor VDR2 are chip components in this example. The circuit board 41 is placed inside the microphone capsule 200, an example of which is showed on different scale by the board 41 in FIG. 4. Two output contacts OC1 and OC2 are enough in microphone capsule, because of the electret microphone needs, as known, no separate supply voltage. Of course into the capsule can be led a separate supply voltage, too.

Figure 5:
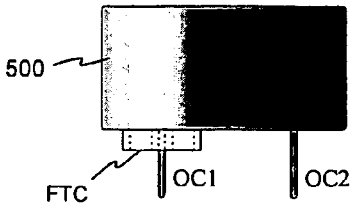
FIG. 5 shows an example of ESD-protection arrangement.

FIG. 5 presents an example of ESD-protector outside the microphone capsule. In Figure can be seen a microphone capsule 500 and first and second output contact OC1, OC2. Further the structure comprises an ESD-protector FTC fastened according to invention on the bottom of microphone capsule. The protector FTC (feed through component) is in this example a cylindrical piece having a hole with conductive surface in the direction of axis, and having conductive sheet which is galvanically connected to the casing of capsule. First output contact extends through said hole. Second output contact is galvanically connected to the casing of capsule.

FIGS. 6–9 present results of tests, in which to the microphone circuit is supplied modulated high frequency signal. At the poles of microphone is measured, how strong disturbance occurs at frequency 1 kHz. In Figures is marked with horizontal line the boundary of hazardous disturbance (−35 dBpa).

Figure 6:
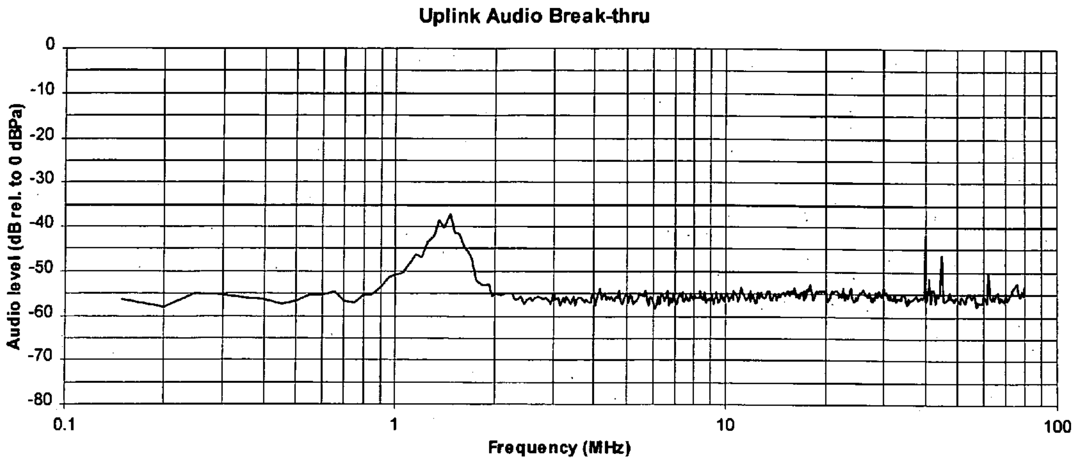
FIG. 6 presents measured audio disturbance level at frequency range 0.15–80 MHz for the microphone structure according to FIG. 1.

FIG. 6 shows the result of known structure according to FIG. 1. The measured audio level is presented as a function of high frequency at the range of 150 kHz–80 MHz. In Figure can be seen that the disturbing level stays below said boundary, but is quite near it at frequency 1,5 MHz.

Figure 7:
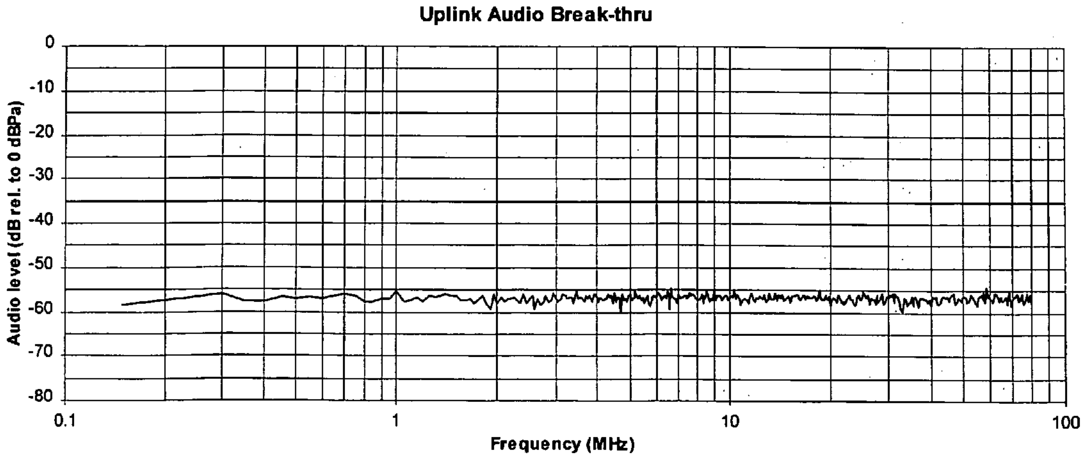
FIG. 7 presents measured audio disturbance level at frequency range 0.15–80 MHz for the microphone structure according to invention.

FIG. 7 shows the result when the known microphone capsule is replaced with a microphone capsule according to the invention, FIG. 2. The capacitance C2 is 10 pF, the resistance R21 is 47 Ω and the internal capacitance of varistor VDR2 is 360 pF. In Figure can be seen that the disturbing level stays at whole measuring range very near the noise level about −58 dBpa. When the external components corresponding the circuit 110 in FIG. 1 are removed, the result is essentially same as in FIG. 7. The better protection is then wholly achieved by the Π-type protection circuit inside microphone capsule.

Figure 8:
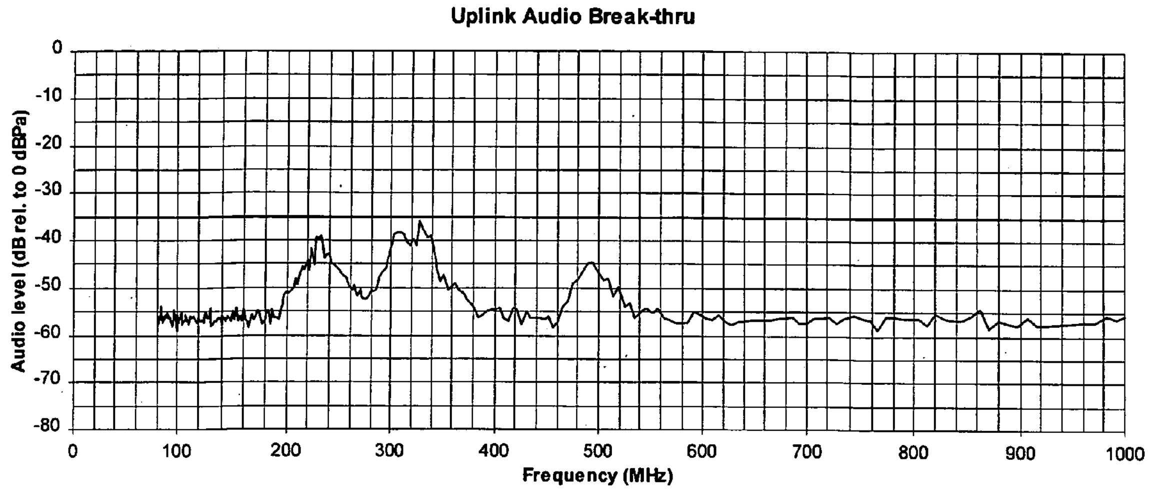
FIG. 8 presents measured audio disturbance level at frequency range 80–1000 MHz for the microphone structure according to FIG. 1.

FIG. 8 shows the result of known structure according to FIG. 1. The measuring frequency range is now 80 MHz–1 GHz. In Figure can be seen that the disturbing level stays below said boundary, but is remarkable high at frequency bands about 200–370 MHz and 470–520 MHz.

Figure 9:
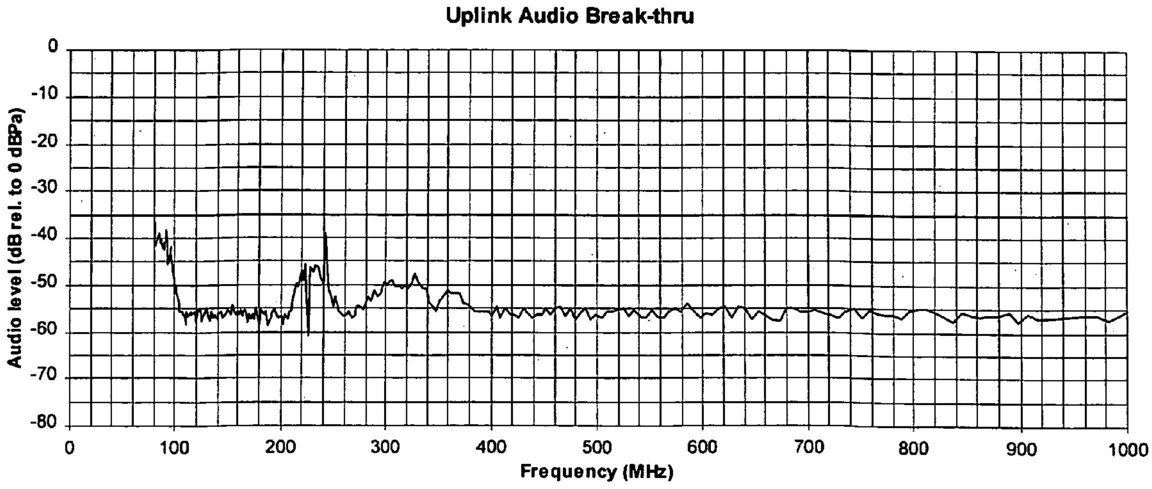
FIG. 9 presents measured audio disturbance level at frequency range 80–1000 MHz for the microphone structure according to FIG. 1.

FIG. 9 shows the result when the known microphone capsule is replaced with a microphone capsule according to FIG. 2 and external protection circuit 110 is removed. Also the protection circuit of microphone amplifier, as circuit 130 in FIG. 1, there is not. In Figure can be seen that disturbances are distinctly attenuated at frequency band 200–520 MHz compared with FIG. 8. At frequency band 80–100 MHz the disturbing level has risen.

Figure 10:
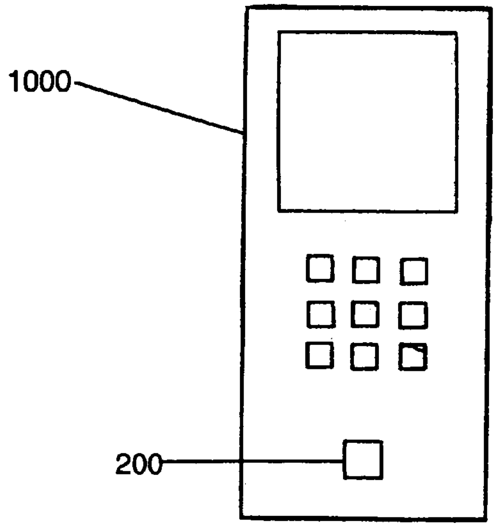
FIG. 10 shows a mobile phone that includes a microphone structure according to the present invention.

FIG. 10 shows a mobile phone 1000 that includes the microphone structure 200 according to the present invention.

Figure 11:
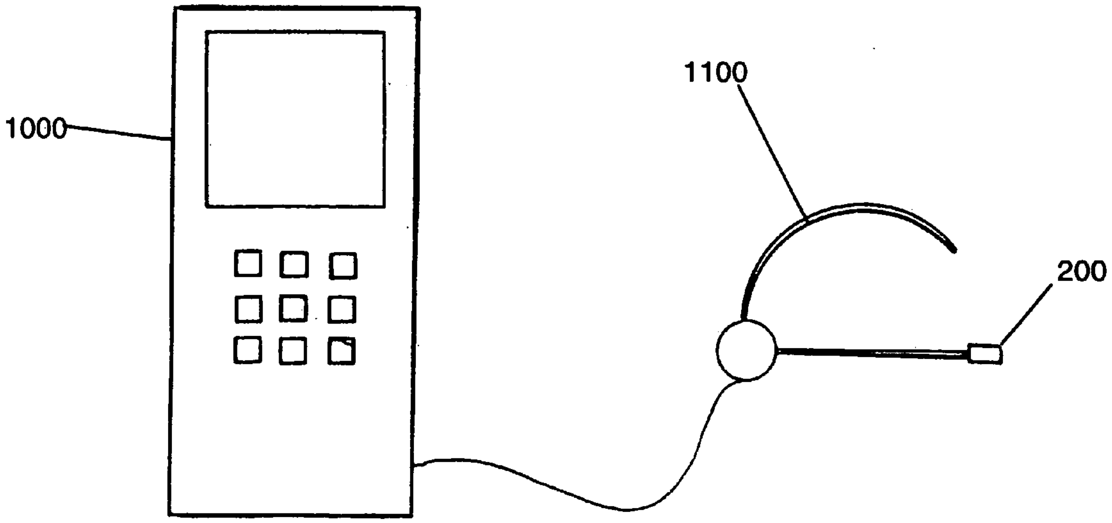
FIG. 11 shows a headset accessory of a mobile phone that includes a microphone structure according to the present invention.

FIG. 11 shows a headset accessory 1100 of the mobile phone 1000 that includes the microphone structure 200 according to the present invention.

Above it is described the basic solution according to the invention and some variants thereof. The invention is not limited to the solutions described. E.g. the microphone may be also some other type as electret microphone. The protection circuit may comprise several ESD-protectors connected e.g. in a star. The inventional idea can be applied in different ways without departing from the scope defined by the independent claim 1.

What is claimed is:

1. A microphone structure comprising a microphone capsule which has at least first and second output contacts, and within said microphone capsule means for converting changes in air pressure to an electrical signal, a preamplifier having first and second output conductors and a first capacitor connected between said output conductors of the preamplifier, the microphone structure further comprising at least one electro-static discharge protector connected between said output contacts of the microphone capsule and being located within the microphone capsule and, also within the microphone capsule, a first impedance in series between said first output conductor and said first output contact for eliminating external protection circuits, for minimizing the areas of conductive loops susceptible to RF disturbances, and for combining ESD protection and RF filtering.

2. A microphone structure according to claim 1, characterized in that it further comprises at least second impedance (Z) in series with said first impedance and at least second capacitor (C33).

3. A microphone structure according to claim 2, characterized in that at least one of said series impedances is resistive.

4. A microphone structure according to claim 2, characterized in that at least one of said series impedances is inductive.

5. A microphone structure according to claim 2, characterized in that said capacitors and structure parts having series impedance form a ladder network.

6. A microphone structure according to claim 2, characterized in that at least one of the pre-amplifier, the first capacitor, the electro-static discharge protector, the first impedance, the second impedance, and the second capacitor are inside an integrated circuit (IC).

7. A microphone structure according to claim 1, characterized in that the preamplifier, electro-static discharge protector, said first impedance and first output conductor and said capacitor are on a circuit board (41).

8. A microphone structure according to claim 1, characterized in that the electro-static discharge protector is a varistor (VDR2).

9. A microphone structure according to claim 1, characterized in that the electro-static discharge protector is a semiconductor (ZD).

10. A microphone structure according to claim 1, characterized in that the electro-static discharge protector is a polymer component.

11. A microphone structure comprising a microphone capsule, which has at least first and second output contacts, and within said microphone capsule means for converting changes in air pressure to an electrical signal, a preamplifier having first and second output conductors and a first capacitor connected between said output conductors of the preamplifier, the microphone structure further comprising the following for eliminating external protection circuits, for minimizing the areas of conductive loops susceptible to RF disturbances, and for combining ESD protection and RF filtering, at least one electrostatic discharge protector being located on an outer surface of the microphone capsule, and, within the microphone capsule, a first impedance in series between said first output conductor and said first output contact.

12. A microphone structure according to claim 11, characterized in that the electro-static discharge protector is a feed-through component (FTC).

13. A mobile phone comprising a microphone structure having a microphone capsule which has at least first and second output contacts, and within said microphone capsule means for converting changes in air pressure to an electrical signal, a preamplifier having first and second output conductors and a first capacitor connected between said output conductors of the preamplifier, the microphone structure further comprising at least one electro-static discharge protector connected between said output contacts of the microphone capsule and being located within the microphone capsule and, also within the microphone capsule, a first impedance in series between said first output conductor and said first output contact for eliminating external protection circuits, for minimizing the areas of conductive loops susceptible to RF disturbances, and for combining ESD protection and RF filtering.

14. A headset comprising a microphone structure having a microphone capsule which has at least first and second output contacts, and within said microphone capsule means for converting changes in air pressure to an electrical signal, a preamplifier having first and second output conductors and a first capacitor connected between said output conductors of the preamplifier, the microphone structure further comprising at least one electrostatic discharge protector connected between said output contacts of the microphone capsule and being located within the microphone capsule and, also within the microphone capsule, a first impedance in series between said first output conductor and said first output contact for eliminating external protection circuits, for minimizing the areas of conductive loops susceptible to RF disturbances, and for combining ESD protection and RF filtering.

* * * * *

UNITED STATES PATENT AND TRADEMARK OFFICE

CERTIFICATE OF CORRECTION

PATENT NO. : 6,928,174 B1 
APPLICATION NO. : 09/711715
DATED : August 9, 2005
INVENTOR(S) : Mantysalo et al.

It is certified that error appears in the above-identified patent and that said Letters Patent is hereby corrected as shown below:

Column 6, line 15, claim 5, after “said” insert --first and second--.

Column 6, line 15-16, claim 5, after “capacitors and” delete “structure parts having series impedance” and insert --first and second impedances--.

Column 6, line 48 , claim 11, delete “electrostatic” and insert --electro-static--.

Column 6, line 48, claim 11, delete “located on” and insert --fastened to--.

Column 8, line 3, claim 14, delete “electrostatic” and insert --electro-static--.

Signed and Sealed this

Eleventh Day of July, 2006

JON W. DUDAS
*Director of the United States Patent and Trademark Office*